United States Patent
Matsumoto et al.

[19]

[11] Patent Number: 6,158,656
[45] Date of Patent: Dec. 12, 2000

[54] FINAL ACCOMMODATION DEVICE FOR POWER-SOURCE DROP

[75] Inventors: Manabu Matsumoto, Handa; Ichiro Yoshida, Takahama, both of Japan

[73] Assignee: Denso Corporation, Kariya, Japan

[21] Appl. No.: 09/096,343

[22] Filed: Jun. 12, 1998

[30] Foreign Application Priority Data

Jul. 16, 1997 [JP] Japan .................................. 9-191128

[51] Int. Cl.$^7$ ............................................... G06K 5/00
[52] U.S. Cl. ........................................ 235/380; 235/384
[58] Field of Search ................................. 235/380, 384, 235/382.5; 323/282

[56] References Cited

U.S. PATENT DOCUMENTS

| | | | |
|---|---|---|---|
| 4,307,455 | 12/1981 | Juhasz et al. | 395/182.22 |
| 5,105,074 | 4/1992 | Nara | 235/492 |
| 5,310,999 | 5/1994 | Claus et al. | |
| 5,351,187 | 9/1994 | Hassett | 395/213 |
| 5,519,871 | 5/1996 | Shimoda | 713/300 |
| 5,557,738 | 9/1996 | Townsley et al. | 395/182.12 |
| 5,933,812 | 8/1999 | Meyer et al. | 705/15 |

FOREIGN PATENT DOCUMENTS

| | | |
|---|---|---|
| 63-44291 | 2/1988 | Japan . |
| 2-42520 | 2/1990 | Japan . |
| 4-137079 | 5/1992 | Japan . |
| 5-257827 | 10/1993 | Japan . |
| 6-60237 | 3/1994 | Japan . |

OTHER PUBLICATIONS

Paul Horowitz and Winfield Hill, "The Art of Electronics" Cambridge University Press, 1980, p. 199.

*Primary Examiner*—Donald Hajec
*Assistant Examiner*—Mark Tremblay
*Attorney, Agent, or Firm*—Pillsbury Madison & Sutro LLP

[57] ABSTRACT

A method and apparatus for enabling a processor to execute processing routine even if a power-source voltage drop occurs during processing. When an ignition key switch 102 is closed, voltage VB is supplied from a vehicle-mounted battery B1 to a comparator AMP of a CPU 108 and to a power-source stabilizer circuit 201 of a regulator 200. Also, capacitors C1 and C2 are charged with a load from the vehicle-mounted battery B1. Even if the power-source line is momentarily interrupted while in this state, the capacitor C1 has already been charged, and so the transition of the drop in voltage VB is gradual compared with a case wherein the capacitor C1 is absent. Additionally, because the capacitor C2 has already been charged, voltage VCC supplied to the CPU 108 from the regulator 200 is held at a fixed value for a certain interval. Because of this, the drop in voltage VCC is delayed and the power source is switched from the vehicle-mounted battery B1 to a battery B2, thereby allowing the CPU 108 to continue to perform uninterrupted data processing.

18 Claims, 8 Drawing Sheets

FINAL ACCOMMODATION DEVICE FOR POWER-SOURCE DROP

CROSS-REFERENCE TO RELATED APPLICATION

This application is based upon and claims the benefit of priority of the prior Japanese Patent Application No. 9-191128, filed on Jul. 16, 1997, the contents of which are incorporated herein by reference.

BACKGROUND OF THE INVENTION

1. Field of the Invention

This invention relates to an accommodation device for power-source drop that supplies voltage in a stable manner to a controller executing predetermined control functions, even when power-source voltage of the controller has dropped.

2. Related Art

A smart card reader/writer that executes predetermined controls is known. A method for supplying power to a smart card reader/writer from a vehicle-mounted battery via a cigarette lighter is disclosed in Japanese Patent Application Laid-open No. Heisei 6-60237. Additionally, a method for supplying power to a smart card reader/writer from a battery is disclosed in Japanese Patent Application Laid-open No. Showa 63-44291.

However, when the power-source line from the vehicle-mounted battery to the smart-card reader/writer is interrupted by operating the ignition key, or by switching the vehicle's engine on or off while the smart card reader/writer is processing the data on the smart card, the voltage supplied from the vehicle-mounted battery drops. Consequently, the smart-card reader/writer is unable to execute data processing. This inability to process data results in problems such as failure to write data to the smart card, or corruption of data.

Additionally, the output of the battery fluctuates according to the battery's usage history, ambient temperature, and other load-usage conditions. Thus, when the battery's output voltage drops while the smart-card reader/writer is processing smart card data, the smart-card reader/writer cannot execute data processing. A similar problem occurs in cases where the battery is inadvertently detached, or the supply of voltage is momentarily interrupted due to faulty battery contact while the smart-card reader/writer is processing smart card data.

Further, the occurrence of the above-described problems is not limited to a smart-card reader/writer.

SUMMARY OF THE INVENTION

Accordingly, in light of the foregoing problems, it is an object of this invention to provide an apparatus supporting a power-source drop which can continue to process even if the power-source voltage drops while a controller is executing processing.

In particular, the present invention provides an apparatus accommodating power-source drop. The apparatus includes a main power source and an auxiliary power source. A controller executes processing routines when voltage is supplied from either the main power source or the auxiliary power source and the supplied voltage is greater than or equal to an operating voltage.

Detecting means detects when voltage of said main power source is not more than a predetermined voltage greater than the operating voltage. A switch switches the controller from the main power source to the auxiliary power source after voltage of the main power source has been detected by the detecting means to have dropped to the predetermined voltage.

Means for delaying delays a drop in voltage supplied from the main power source to the controlling means so that voltage supplied from the main power source to the controlling means becomes greater than or equal to the operating voltage until the switch switches from the main power source to the auxiliary power source when voltage of the main power source has dropped.

Thus, the present invention allows a smart card reader/writer to continue operating even when the main power source is depleted by switching the reader/writer to a backup power source, without affecting processing during the switch.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENT

An embodiment of this invention will be described hereinafter with reference to the drawings. This embodiment applies this invention in a smart-card reader/writer of an automatic toll-collection system for a vehicle employing a smart card. This automatic toll-collection system communicates between a smart-card reader/writer installed on a vehicle and a roadside device disposed at a toll-road access point. When the smart-card reader/writer receives toll data from the roadside device, it writes this toll data to the smart card.

First Embodiment

Figure 1:
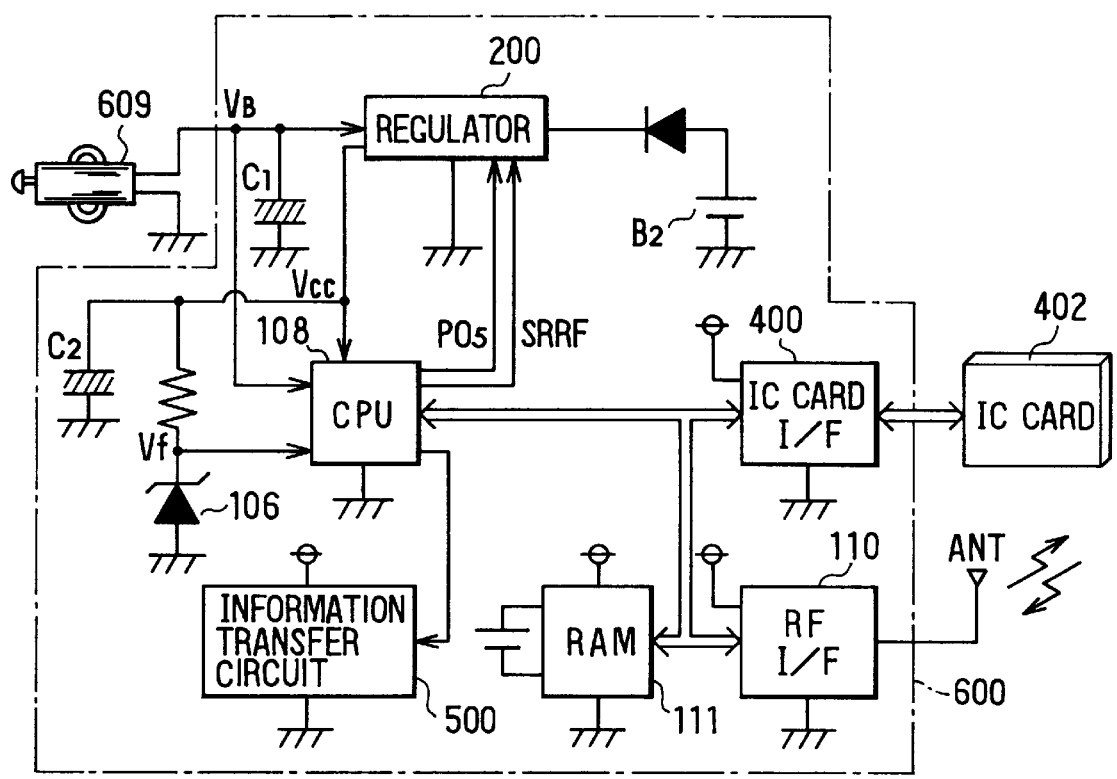
FIG. 1 is a circuit diagram depicting a schematic structure of a smart-card reader/writer according to a first embodiment.
Figure 2:
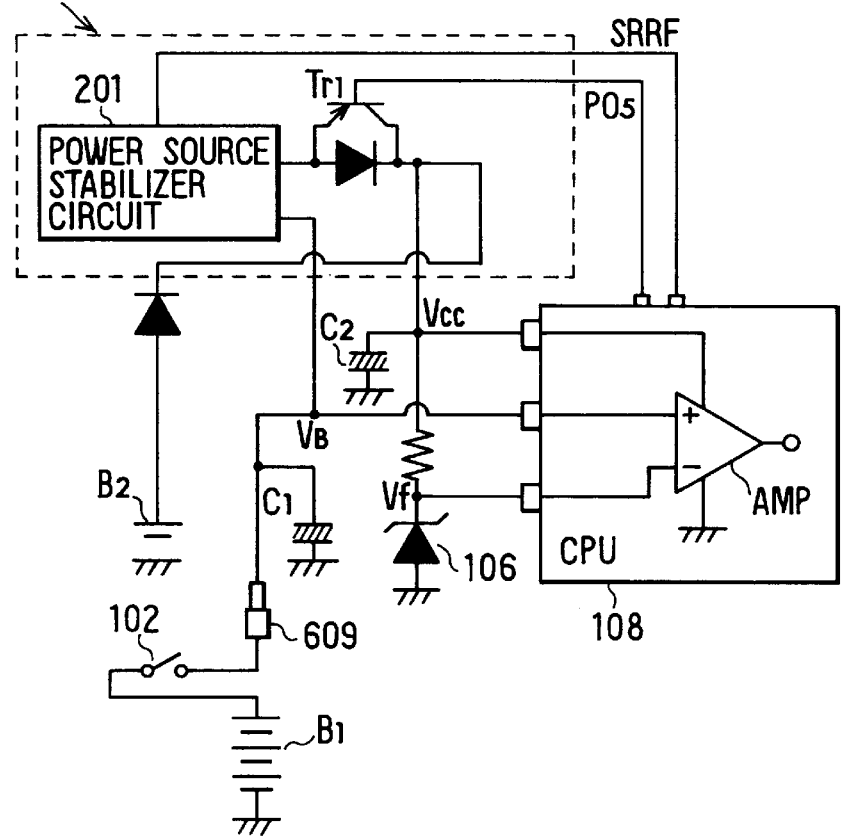
FIG. 2 is a circuit diagram showing the structure of an essential portion of the smart-card reader/writer according to the first embodiment.

FIG. 1 is a schematic structural view of a first embodiment of a smart-card reader/writer 600 which is part of an apparatus accommodating power-source drop. FIG. 2 is a detailed view of an essential portion thereof.

As shown in FIG. 1, the smart-card reader/writer 600 is provided with a communication circuit 110 and antenna ANT to transmit and receive data with respect to a roadside device (not illustrated) disposed at a toll-road access point. A RAM 111 temporarily stores data for transmitting or receiving. A smart card 402 stores data relating to automatic toll collection. A smart-card reader/writer interface 400 reads and writes data stored on the smart card 402. A cigarette-lighter socket 609 is linked via an ignition key switch 102 (refer to FIG. 2) to a vehicle-mounted battery B1 (refer to FIG. 2) as a main power source. A battery B2 is an auxiliary power source. A regulator 200 converts voltage VB supplied from the vehicle-mounted battery B1 to voltage VCC. Additionally, the smart-card reader/writer 600 is provided with a CPU 108 that receives operating voltage VCC from the regulator 200. The CPU 108 functions to detect a drop in voltage VB supplied from the vehicle-mounted battery B1. The CPU 108 also functions to switch the power source from the vehicle-mounted battery B1 to the battery B2. Further, the CPU 108 functions to process data received from the roadside device and data read from the smart card 402. The smart-card reader/writer 600 also includes a Zener diode 106 to generate a reference voltage Vf for detecting a voltage drop at the vehicle-mounted battery B1. Also, capacitors C1 and C2 prevent momentary interruption of the power source to the CPU 108, allowing the CPU 108 to operate in a stable manner. In addition, an information-transfer circuit 500 is provided to notify a rider of a voltage drop at the vehicle-mounted battery B1.

As shown in FIG. 2, the CPU 108 is provided with a comparator AMP to receive voltage VCC supplied from the regulator 200, input voltage VB supplied from the vehicle-mounted battery B1, and the reference voltage Vf, and to compare the magnitudes thereof. The regulator 200 is provided with a power-source stabilizer circuit 201 to convert voltage VB supplied from the vehicle-mounted battery B1, and a transistor Tr1 to control voltage converted by the power-source stabilizer circuit 201. When voltage VB supplied from the vehicle-mounted battery B1 becomes smaller than the operating voltage of the CPU 108, voltage VCC supplied from the regulator changes in accordance with voltage VB. When the CPU 108 determines, by virtue of comparator AMP, that voltage VB supplied from the vehicle-mounted battery B1 is greater than the reference voltage Vf, the power-source stabilizer circuit 201 is placed in an operational state by an "on" signal via a signal line SRRF. Also, the transistor Tr1 is switched on by an "on" signal via a signal line PO5.

Meanwhile, during reading/writing of data from/to the smart card 402, if the comparator AMP determines that voltage VB supplied from the vehicle-mounted battery B1 is less than the reference voltage Vf, the power-source stabilizer circuit 201 is placed in a nonoperational state by an "off" signal via the signal line SRRF. Also, the transistor Tr1 is switched off by an "off" signal via the signal line PO5. Further, before the ignition key switch is 102 is closed, the voltage of battery B2 is supplied via the regulator 200 to the capacitor C2 and the CPU 108 as voltage VCC. Herein, the voltage of vehicle-mounted battery B1 is approximately 12 V, and the operating voltage of CPU 108 and the voltage of battery B2 are approximately 5 V. The reference voltage Vf is set between the voltage of the vehicle-mounted battery B1 and the operating voltage of the CPU 108, at approximately 10 V.

Figure 3:
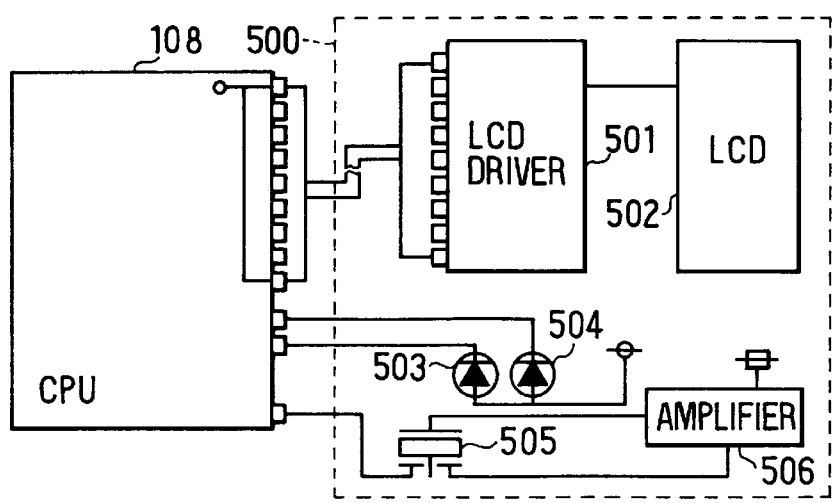
FIG. 3 is a block diagram showing the structure of an information-transfer circuit.

FIG. 3 depicts the information-transfer circuit 500 that notifies a rider of a voltage drop of the vehicle-mounted battery B1. The information-transfer circuit 500 includes an LCD 502 to display the voltage drop of the vehicle-mounted battery B1 to the rider. An LCD driver 501 receives a signal from the CPU 108, indicating voltage drop of the vehicle-mounted battery B1, and drives the LCD 502 in correspondence thereto. LEDs 503 and 504 receive a signal from the CPU 108 indicating voltage drop of the vehicle-mounted battery B1, and flash in response thereto. A bell 505 receives a signal from the CPU 108 indicating voltage drop of the vehicle-mounted battery B1, and generates an alarm tone in response thereto. An amplifier 506 is connected to the bell 505.

Operation of the smart-card reader/writer 600 structured in the above-described manner will be described as follows.

When the ignition key switch 102 is closed, voltage VB supplied from the vehicle-mounted battery B1 is supplied to the comparator AMP of the CPU 108 and the power-source stabilizer circuit 201 of the regulator 200. Also, capacitor C1 is charged with the electrical charge load from the vehicle-mounted battery B1. As was described above, the comparator AMP compares voltage VB supplied from the vehicle-mounted battery B1 and the reference voltage Vf. When voltage VB from the vehicle-mounted battery B1 is greater than the reference voltage Vf, the power-source stabilizer circuit 201 is placed in an operating state and the transistor Tr1 is switched on by signals output from the CPU 108 via the signal lines SRRF and PO5. Accordingly, voltage VB supplied from the vehicle-mounted battery B1 is converted by the power-source stabilizer circuit 201 and supplied via the transistor Tr1 to the CPU 108 as voltage VCC. At this time, the capacitor C2 is charged with an electrical charge by voltage VCC.

Figure 4A:
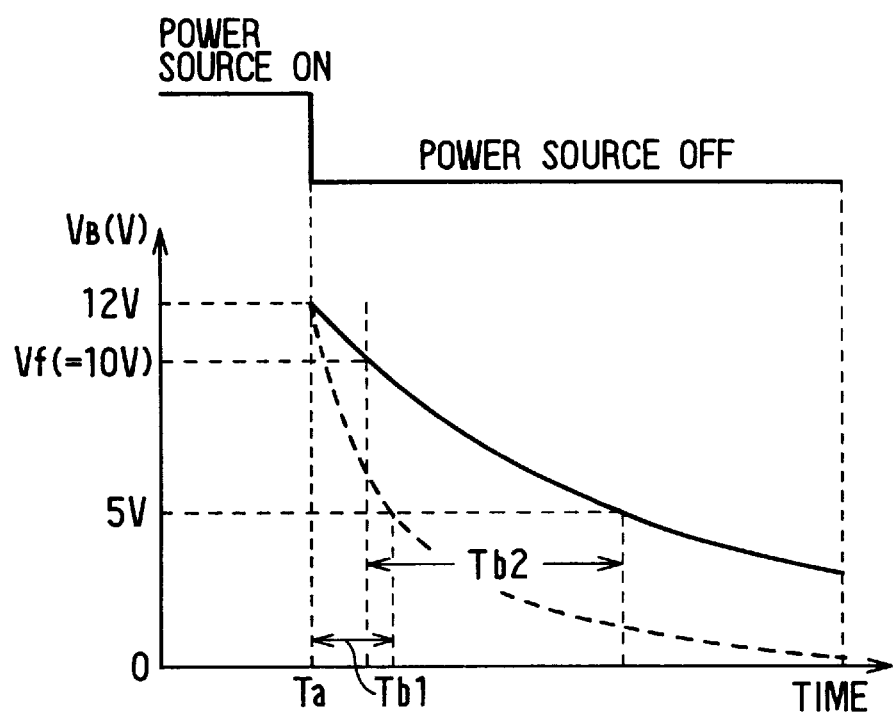
FIG. 4A is a graph depicting change in voltage VB (i.e., voltage compared with a reference voltage Vf by a comparator AMP) supplied from a vehicle battery B1.
Figure 4B:
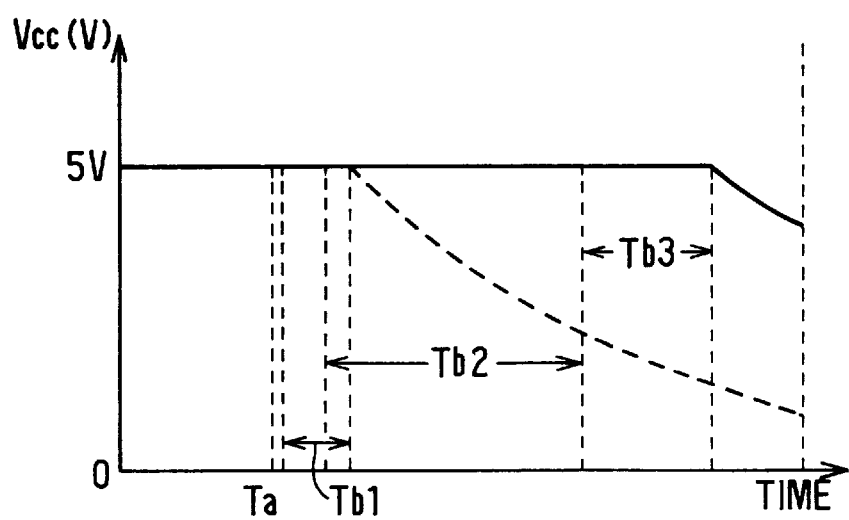
FIG. 4B is a time graph depicting change in voltage VCC supplied from the regulator.

FIGS. 4A, 4B are used to describe the operation of the present invention for the case where the power-source line from vehicle-mounted battery B1 to smart-card reader/writer 600 is momentarily interrupted, and voltage VB supplied from the vehicle-mounted battery B1 has dropped after the ignition key switch 102 has been closed. In FIG. 4A, the graph drawn with the solid line shows the change in voltage VB (i.e., the voltage which the comparator AMP compares with the reference voltage Vf) supplied from the vehicle-mounted battery B1 in the present invention. The graph drawn with the broken line shows the change in voltage VB supplied from the vehicle-mounted battery B1 in the case where the capacitor C1 is absent. In FIG. 4B, the time graph drawn with the solid line shows the change in voltage VCC supplied from the regulator 200 in this embodiment. The graph drawn with the broken line shows the change in voltage VCC supplied from the regulator 200 in a case where the capacitor C2 is absent.

At time Ta in FIG. 4A, indicating that the power-source line has been momentarily interrupted, voltage VB begins to drop. Accordingly, during reading/writing of data from/to the smart card 402, when voltage VB drops below the reference voltage Vf (=10 V), the CPU 108 outputs signals via the signal lines SRRF and PO5 to attempt to place the power-source stabilizer circuit 201 in a nonoperating state and to attempt to switch off the transistor Tr1.

At this time, as shown by the broken line graph of FIG. 4A, which indicate the case where the capacitor C1 is absent, the transition of the drop in voltage VB is precipitous, and so the time period from time Tb1 until voltage VB falls to the operating voltage of the CPU 108 (=5 V) is short. It is therefore is possible that voltage VB may drop below the operating voltage of the CPU 108 before the power-source stabilizer circuit 201 assumes a nonoperating state and transistor Tr1 is switched off. Additionally, as shown by the broken line graph of FIG. 4B, which indicates the case where the capacitor C2 is absent, when voltage VB becomes less than or equal to the operating voltage of the CPU 108, the foregoing time Tb1 lapses. Therefore, voltage VCC immediately begins to fall in correspondence with voltage VB, and so voltage VCC drops below the operating voltage of the CPU 108. When voltage VCC falls below the operating voltage of the CPU 108, the CPU 108 stops being supplied with the voltage required for operation thereof, and it becomes impossible to place the power-source stabilizer circuit 201 in nonoperating state and to switch off the transistor Tr1. Moreover, because the CPU 108 cannot operate, data processing cannot be performed. As a result, problems occur wherein data is not written to the smart card 402, and data is corrupted.

However, with the present invention, as shown by the solid lines in FIG. 4A, capacitor C1 is already charged in the interval in which the ignition key switch 102 is closed before the power-source line is momentarily interrupted, and so the transition of the drop in voltage VB is gradual compared with a case wherein the capacitor C1 is absent. Accordingly, the period from time Tb2 until voltage VB falls from the reference voltage Vf to the operating voltage of the CPU 108 becomes longer. Therefore, the CPU 108 can place the power-source stabilizer circuit 201 in a nonoperating state and switch off the transistor Tr1 before voltage VB falls to the operating voltage of the CPU 108 during reading/writing of data from/to the smart card.

Additionally, with this embodiment, even if the voltage VB suddenly drops for some reason, to a voltage less than or equal to the operating voltage of the CPU 108 when the power-source line is momentarily interrupted, capacitor C2 is already charged in the interval in which the ignition key switch 102 is closed before the power-source line is momentarily interrupted. Therefore, voltage VCC is maintained at a uniform value during time Tb3, as shown by the solid lines in FIG. 4B. Accordingly, even if the CPU 108 is not able, during time Tb2, to place the power-source stabilizer circuit 201 in a nonoperating state together with switching off the transistor Tr1, during time Tb3 and thereafter the CPU 108 can place the power-source stabilizer circuit 201 in a nonoperating state and switch off the transistor Tr1. Thereafter, voltage VB supplied from the vehicle-mounted battery B1 is not converted by the regulator 200. Instead, once voltage of the battery B2 has been input to the regulator 200, it is supplied to the capacitor C2 and the CPU 108 as voltage VCC. The capacitance values of the capacitors C1 and C2 are set in consideration of delay time.

At the same time, the CPU 108 outputs a signal to the information-transfer circuit 500, and the rider is notified that voltage VB of the vehicle-mounted battery B1 has dropped.

As was described above, with this embodiment, a drop in voltage VCC is delayed, and the power source is switched from the vehicle-mounted battery B1 to the battery B2 by disposing the capacitors C1 and C2. Therefore, the CPU 108 can perform data processing even when the power-source line is momentarily interrupted.

Second Embodiment

Figure 5:
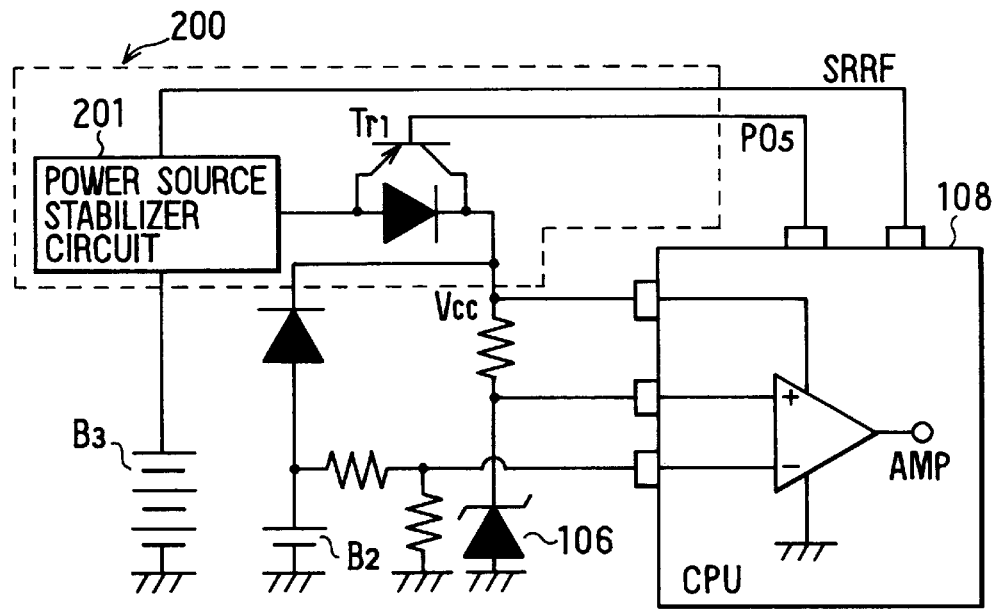
FIG. 5 is a circuit diagram showing the structure of an essential portion of a smart-card reader/writer according to a second embodiment.

FIG. 5 is a detailed view of an essential portion of a smart-card reader/writer 600 according to a second embodiment. This embodiment employs a battery B3 instead of the vehicle-mounted battery B1 as a main power source.

This embodiment employs a comparator AMP to constantly compare voltage obtained by converting voltage of the battery B3 with the power-source stabilizer circuit 201 and voltage of the battery B2, using the battery with the higher voltage as the power source. By doing this, the battery B3 supplying voltage to the power-source stabilizer circuit 201 can be employed as a power source to allow the CPU 108, and the like, to operate in a when the power-source supplying capacity of the battery B3 is still high even when the battery B3 has been depleted. The smart-card reader/writer 600 does not perform data processing when the power-source stabilizer circuit 201 cannot be placed in an operating state, even when the power-source supplying capacity of the battery B3 is greater than the battery B2. With this embodiment, voltage of the battery B2 may be initially set at the reference voltage Vf.

Third Embodiment

Figure 6:
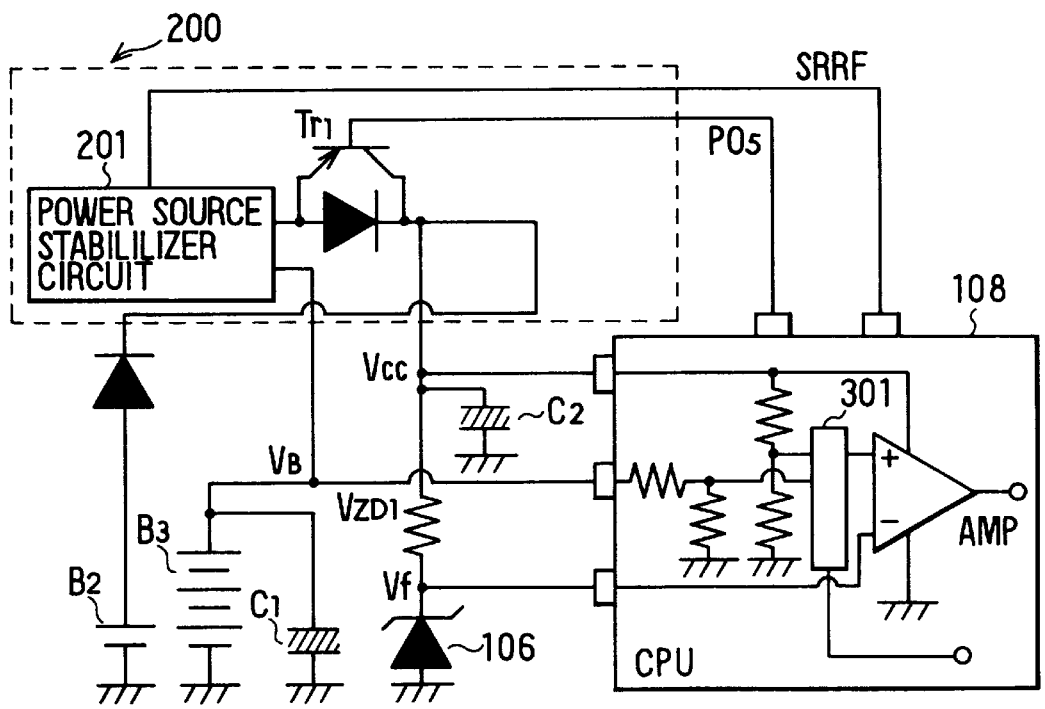
FIG. 6 is a circuit diagram showing the structure of an essential portion of a smart-card reader/writer according to a third embodiment.

FIG. 6 is a detailed view of an essential portion of a smart-card reader/writer 600 according to a third embodiment. In this embodiment, a multiplexer 301 is connected to a noninverting input terminal of the comparator AMP within the CPU 108, in contrast to the structure of the first embodiment shown in FIG. 1. This multiplexer 301 switches voltage input to the noninverting input terminal of the comparator AMP within the CPU 108. That is to say, when the power-source stabilizer circuit 201 operates and switches on the transistor Tr1, and operating voltage is supplied to the CPU 108 from the battery B3, voltage VB supplied from the battery B3 is input to the noninverting input terminal of the comparator AMP. Meanwhile, in the case where the power-source stabilizer circuit 201 does not operate and switch on the transistor Tr1, and operating voltage is supplied to the CPU 108 from the battery B2, voltage VB supplied from the battery B2 is input to the noninverting input terminal of the comparator AMP. In this way, the batteries B2 and B3 are switched, and voltage supplied from either one or the other is compared with the reference voltage Vf.

Fourth Embodiment

Figure 7:
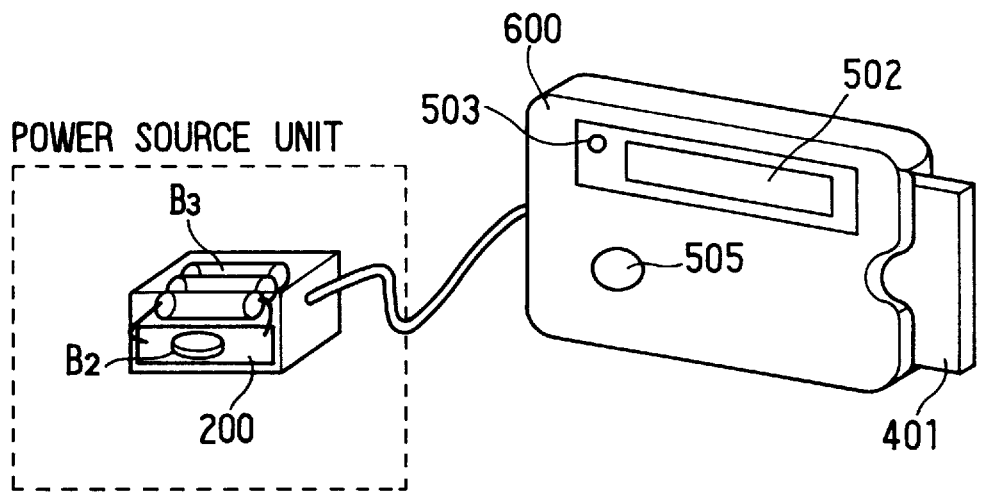
FIG. 7 is a drawing showing the typical connections between the smart-card reader/writer and a vehicle-mounted battery B1, a battery B2, and a regulator.
Figure 8:
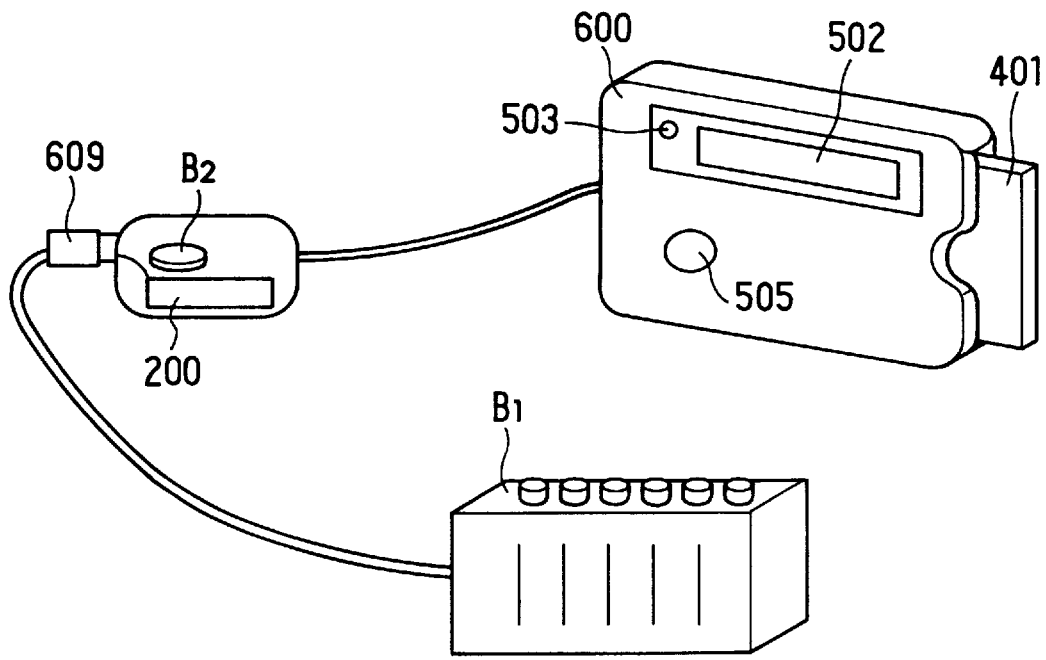
FIG. 8 is a drawing showing the typical connections between the smart-card reader/writer 600 and a battery B3, the battery B2, and the regulator.

The above-described embodiment was provided with the battery B3 as the main power source, the battery B2 as the auxiliary power source, and the regulator 200 within the smart-card reader/writer 600. However, these components may be provided separately from the smart-card reader/writer 600. FIG. 7 is a typical drawing depicting the connections of the smart-card reader/writer 600 with the battery B3, the battery B2 and the regulator 200 in a case where the battery B3 is employed as the power source. As shown in FIG. 7, the battery B3, the battery B2, and the regulator 200 may be configured as an integrated power-source unit. Additionally, FIG. 8 is a typical drawing depicting the connections of the smart-card reader/writer 600 with the vehicle-mounted battery B1, the battery B2 and the regulator 200 in a case where the vehicle-mounted battery B1 is employed as the power source. As shown in FIG. 8, the battery B2 and the regulator 200 may be disposed within the cigarette-lighter socket 609.

Fifth Embodiment

Figure 9:
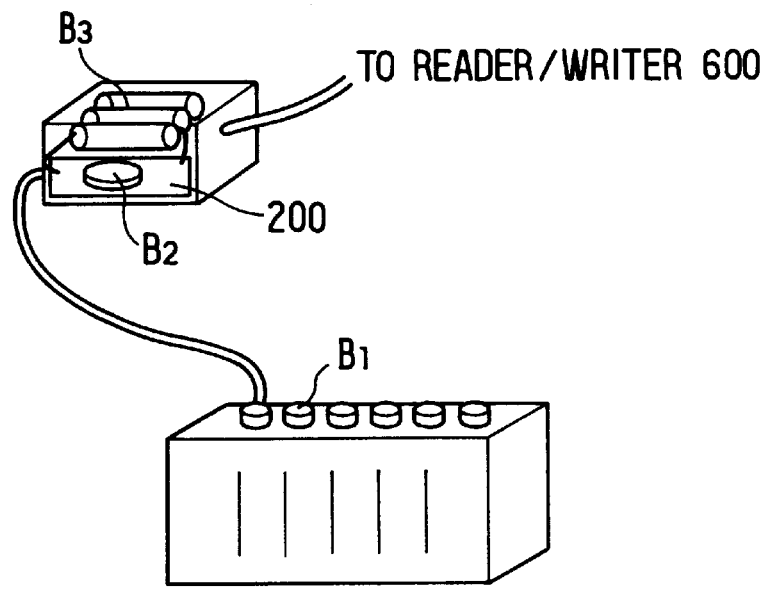
FIG. 9 is a drawing showing the typical connections between the vehicle-mounted battery B1 and the battery B3, the battery B2, and the regulator 200.
Figure 10:
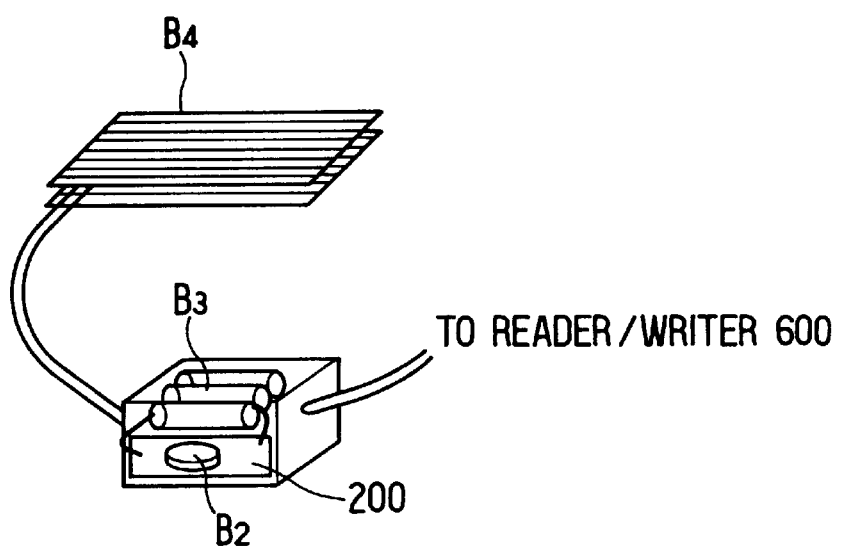
FIG. 10 is a drawing showing the typical connections between a solar battery B4 and the battery B3, the battery B2, and the regulator 200.

The above-described battery B3 may employ a rechargeable secondary battery (storage cell). For example, the battery B3 may be connected to the vehicle-mounted battery B1 so that the vehicle-mounted battery B1 charges the battery B3, as shown in FIG. 9. Alternatively, a solar battery B4 may be mounted on the vehicle's roof or dashboard so that the solar battery B4 charges the battery B3, as shown in FIG. 10.

Figure 11:
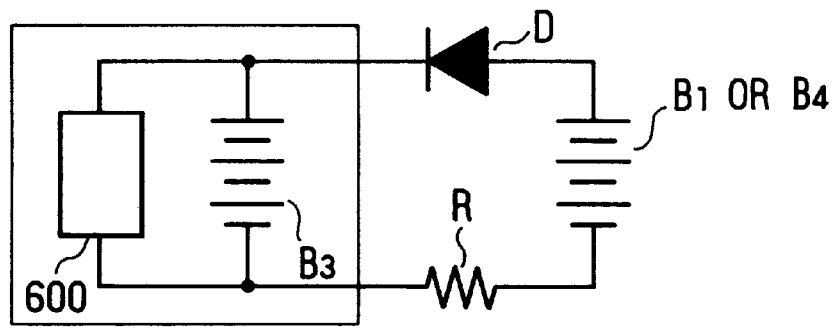
FIG. 11 is a circuit diagram for charging the battery B3 (secondary battery) with the vehicle-mounted battery B1 or the solar battery B4.

FIG. 11 shows a circuit for charging the battery B3 (secondary battery) with the vehicle-mounted battery B1 or the solar battery B4. One diode D and one resistor R are provided in the circuit diagram of FIG. 11. In FIG. 11, the current value for replenishing power consumed by the smart-card reader/writer 600, which is a load on the battery B3, is predetermined, and the resistance value of the resistor R is adjusted so that the current supplied to the battery B3 becomes this value.

Figure 12:
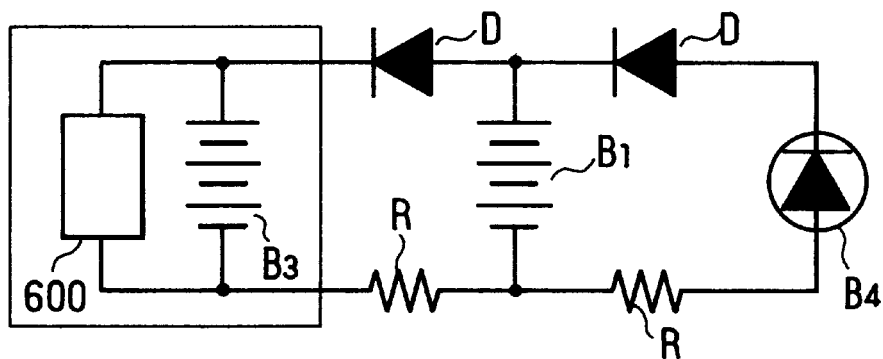
FIG. 12 is a circuit diagram for charging the battery B3 (secondary battery) with the vehicle-mounted battery B1 and the solar battery B4.

Additionally, the battery B3 may be charged using both the above-described vehicle-mounted battery B1 and the solar battery B4. FIG. 12 shows a circuit diagram for charging the battery B3 (secondary battery) with the vehicle-mounted battery B1 and the solar battery B4. In FIG. 12, the vehicle-mounted battery B1 and the solar battery B4 are connected in parallel, and diodes D and resistors R are provided for reasons similar to FIG. 11.

Figure 13:
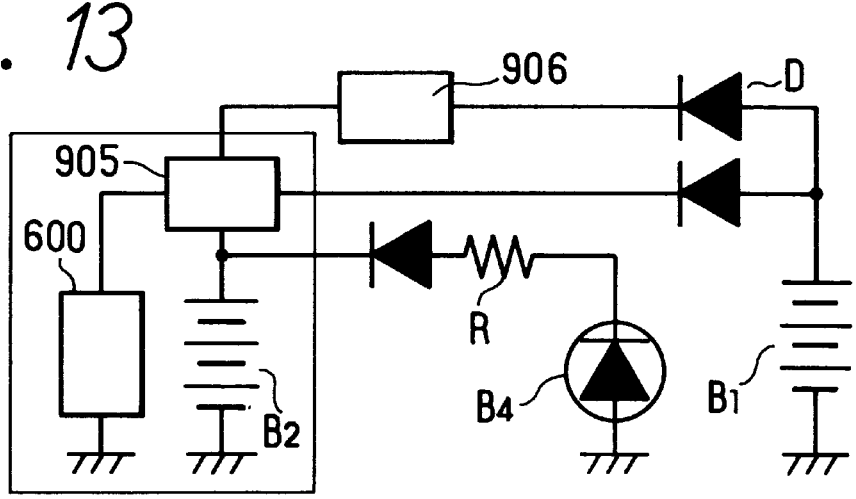
FIG. 13 is a circuit diagram for charging the battery B2 (secondary battery) with the vehicle-mounted battery B1 and the solar battery B4.

A secondary battery may be employed not only for the battery B3, which is the main power source, but also for the battery B2, which is the auxiliary power source. FIG. 13 is a circuit diagram for charging the battery B2 (secondary battery) with the vehicle-mounted battery B1 and the solar battery B4. A power-source switching circuit 905 is connected to the battery B2, which is the auxiliary power source, and is connected via a power-source stabilizer circuit 906 and diodes D to the vehicle-mounted battery B1. The solar battery B4 is connected via a diode D and a resistor R to the battery B2. With the foregoing structure, the battery B2 is supplied with the predetermined current from the vehicle-mounted battery B1 and the solar battery B4, and charged.

Figure 14:
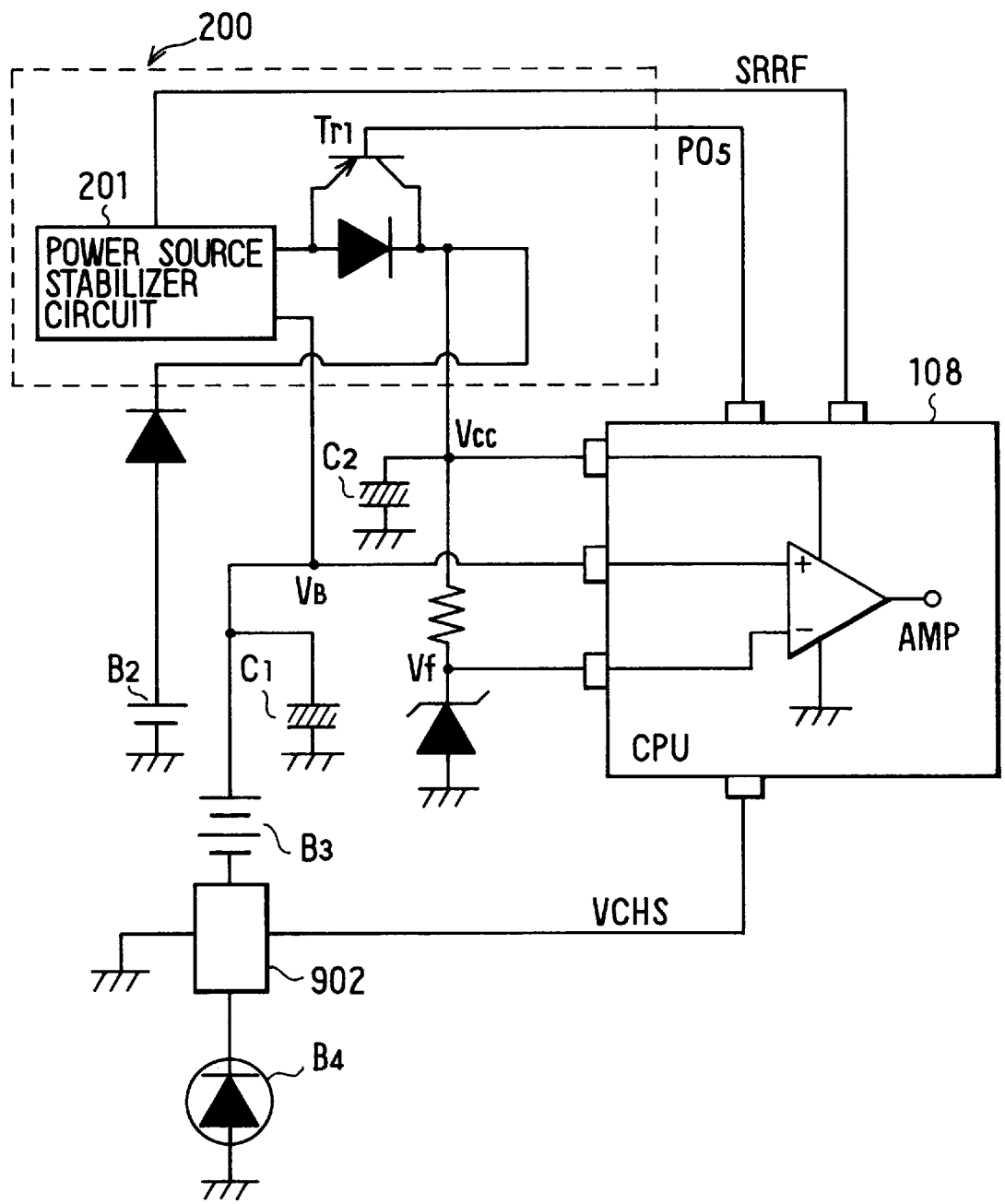
FIG. 14 is a circuit diagram showing the structure of an essential portion of a smart-card reader/writer provided with an overcharge-preventing circuit to interrupt the connection between the solar battery B4 and the battery B3.

Additionally, to prevent overcharging of the secondary battery when a secondary battery is charged using the vehicle-mounted battery B1 or the solar battery B4, the connection between the vehicle-mounted battery B1 or the solar battery B4 and the secondary battery may be interrupted when the voltage of the secondary battery being charged becomes a fixed value or more. For example, as shown in FIG. 14, an overcharge-preventing circuit 902 is provided to interrupt the connection of the solar battery B4 and the battery B3 in a case where the voltage of the battery B3 (secondary battery) which is the main power source becomes greater than or equal to a fixed value. In FIG. 14, the CPU 108 periodically determines the voltage of the battery B3 being charged. In the case where the voltage is determined to be greater than or equal to a predetermined voltage, CPU 108 outputs a signal via a signal line VCHS to the overcharge-preventing circuit 902. In this way, the connection between the solar battery B4 and the battery B3 is interrupted, and charging is stopped.

In the above-described embodiments, the names of the main power source and the auxiliary power source are employed for the sake of convenience, and the terms "main" and "auxiliary" hold no special significance. Additionally, battery size, quantity, and so on may be configured or combined as desired. Further, in order to charge the secondary battery with the solar battery, it is necessary to set the operating voltage to be slightly higher than the power-source voltage of the secondary battery.

What is claimed is:

1. An apparatus for accommodating power source drop in a motor vehicle smart card reader/writer, comprising:

a main power source including a motor vehicle battery that provides power to a power outlet, coupled to the smart card reader/writer, in response to an ignition key switch;

an auxiliary power source;

a controller that executes processing routines when voltage is supplied from either the main power source or the auxiliary power source, the supplied voltage being greater than or equal to an operating voltage;

a mechanism that detects when the supplied voltage is not greater than a predetermined voltage, the predetermined voltage being greater than the operating voltage;

a switch that switches the controller from the main power source to the auxiliary power source after the supplied voltage has been detected by the detecting mechanism to have dropped to the predetermined voltage; and a mechanism that delays a drop in the supplied voltage so that the supplied voltage becomes greater than or equal to the operating voltage until the switch switches the controller from the main power source to the auxiliary power source when voltage of the main power source has dropped.

2. The apparatus of claim 1, further comprising:

a mechanism that stabilizes a power source, connected between the main power source and the controller, by switching voltage of the main power source to a fixed voltage, and by supplying the fixed voltage to the controller when the supplied voltage is greater than or equal to the operating voltage.

3. The apparatus of claim 2, wherein the switch causes operation of the power source stabilizing mechanism to stop when the supplied voltage has been detected by the detecting mechanism to have dropped to the predetermined voltage.

4. The apparatus of claim 1, wherein the predetermined voltage is a voltage of the auxiliary power source.

5. The apparatus of claim 1, wherein after the switch switches the controller from the main power source to the auxiliary power source, the detecting mechanism operates to detect whether a voltage of the auxiliary power source is less than or equal to the predetermined voltage.

6. The apparatus of claim 1, further comprising, a mechanism that provides notification of a main power-source voltage drop when voltage of the main power source has been detected by the detecting mechanism to have dropped to the predetermined voltage.

7. The apparatus of claim 1, further comprising a mechanism that recharges the main power source.

8. The apparatus of claim 1, wherein the auxiliary power source comprises a d.c. battery.

9. The apparatus of claim 1, further comprising a comparator that compares the voltage of the main power source with the voltage of the auxiliary power source and uses one of the main power source and the auxiliary source having a higher voltage.

10. The apparatus of claim 1, further comprising a multiplexer that switches the controller to either the main power source or the auxiliary power source in response to operating parameters of the detecting mechanism and the delaying mechanism.

11. The apparatus of claim 1, wherein the main power source, the auxiliary power source, the detecting mechanism and the delay mechanism are housed together and are separate from the controller.

12. The apparatus of claim 1, wherein the delaying mechanism comprises a first capacitor that is connected to the controller and charged by the main power source, the first capacitor causing the supplied voltage to decrease gradually wen the supplied voltage drops below a predetermined level, thereby allowing the controller to adjust thereto in a noninterrupted manner.

13. The apparatus of claim 12, further comprising a second capacitor that is connected to the controller and charged by a voltage regulator to ensure that the controller operating voltage is maintained as the controller switches from the main power source to the auxiliary power source when the supplied voltage falls below an operating voltage level of the controller.

14. The apparatus of claim 1, wherein the apparatus is implemented in a motor vehicle component of an automatic toll system.

15. The apparatus of claim 13, further comprising a writing mechanism for writing toll data to an integrated circuit toll card.

16. A power supply system for a motor vehicle smart card reader/writer, comprising:

a primary power source that provides voltage to the smart card reader/writer, the primary power source including a motor vehicle battery that provides power to a power outlet, coupled to the smart card reader/writer, in response to an ignition key switch;

a secondary power source that alternatively provides voltage to the smart card reader/writer;

a voltage regulator that converts voltage provided from either the primary or the secondary power source to a smart card operating voltage;

a controller that is programmed to detect a drop in voltage at the primary power source below a reference voltage and to switch the smart card reader/writer from the primary power source to the secondary power source upon detection of same; and a delay circuit that allows uninterrupted operation of the smart card reader/writer when the controller switches from the primary power source to the secondary power source.

17. The system of claim 16, wherein the controller includes a comparator circuit that receives voltage supplied from the voltage regulator and from the primary power source to compare magnitudes thereof to the reference voltage for power supply monitoring purposes.

18. The system of claim 16, further comprising an information transfer circuit that alerts a vehicle operator that the voltage from the primary power source has dropped below a predetermined level.

* * * * *